(12) United States Patent
Komuro et al.

(10) Patent No.: US 7,876,012 B2
(45) Date of Patent: Jan. 25, 2011

(54) DYNAMO ELECTRIC MACHINE WITH AN ALLOY MEMBER

(75) Inventors: Matahiro Komuro, Hitachi (JP); Yuichi Satsu, Hitachi (JP); Noriaki Hino, Mito (JP)

(73) Assignee: Hitachi, Ltd., Tokyo (JP)

( * ) Notice: Subject to any disclaimer, the term of this patent is extended or adjusted under 35 U.S.C. 154(b) by 24 days.

(21) Appl. No.: 11/641,759

(22) Filed: Dec. 20, 2006

(65) Prior Publication Data

US 2007/0145847 A1 Jun. 28, 2007

(30) Foreign Application Priority Data

Dec. 22, 2005 (JP) ............................. 2005-368990

(51) Int. Cl.
| | |
|---|---|
| H02K 21/12 | (2006.01) |
| H02K 5/10 | (2006.01) |
| H02K 3/48 | (2006.01) |
| H02K 1/02 | (2006.01) |
| H02K 1/06 | (2006.01) |
| H02K 1/27 | (2006.01) |
| H02K 1/12 | (2006.01) |

(52) U.S. Cl. ...................... 310/156.29; 310/45; 310/88; 310/156.49; 310/186; 310/214; 310/271; 310/156.33; 310/156.46; 310/156.51; 310/154.35; 310/43; 310/44; 310/216.064

(58) Field of Classification Search .................. 310/44, 310/45, 216, 216.64, 156.29, 186, 271, 88, 310/156.51, 154.46, 156.33, 154.35, 43, 310/218; H02K 5/10, 21/12, 3/48, 1/27, H02K 1/12, 1/06, 1/02

See application file for complete search history.

(56) References Cited

U.S. PATENT DOCUMENTS

| | | | | |
|---|---|---|---|---|
| 3,844,849 | A * | 10/1974 | Kuroda | ........................ 148/310 |
| 5,684,352 | A * | 11/1997 | Mita et al. | ............. 310/156.56 |
| 5,858,124 | A | 1/1999 | Endo et al. | |
| 6,008,563 | A * | 12/1999 | Baba et al. | ................... 310/254 |
| 6,130,496 | A * | 10/2000 | Takigawa et al. | ............ 310/196 |
| 6,274,962 | B1 * | 8/2001 | Kliman | ........................ 310/261 |
| 6,552,461 | B2 * | 4/2003 | Takahata et al. | ....... 310/156.53 |
| 6,737,951 | B1 * | 5/2004 | Decristofaro et al. | ....... 336/234 |

(Continued)

FOREIGN PATENT DOCUMENTS

JP 49-87006 11/1974

(Continued)

OTHER PUBLICATIONS powder.pdf : Hanejko et al (Technical publication at PM2TEC '96 World Congress Jun. 16-21, 1996—Washington D.C. "Powder Metallurgy Materials for AC Magnetic Applications").*

(Continued)

*Primary Examiner*—Quyen Leung
*Assistant Examiner*—John K Kim
(74) *Attorney, Agent, or Firm*—Antonelli, Terry, Stout & Kraus, LLP.

(57) ABSTRACT

A dynamoelectric machine comprising a stator having a plurality of slots and teeth, armature windings wound around the teeth, and a rotor disposed inside the stator, wherein an alloy member is disposed in the inner periphery of the stator and the magnetic compensator has its surface or inside thereof a high resistance layer.

10 Claims, 4 Drawing Sheets

U.S. PATENT DOCUMENTS

| | | |
|---|---|---|
| 6,838,798 B2 * | 1/2005 | Takahata et al. ........ 310/156.53 |
| 6,902,380 B2 * | 6/2005 | Ojima et al. ............. 417/410.4 |
| 7,215,059 B1 * | 5/2007 | Bitsche et al. ............... 310/269 |
| 2002/0050766 A1 * | 5/2002 | Mori et al. ................... 310/324 |
| 2003/0193260 A1 * | 10/2003 | Reiter et al. ................ 310/217 |
| 2004/0061386 A1 * | 4/2004 | Amagi et al. .................. 310/43 |
| 2004/0085173 A1 * | 5/2004 | Decristofaro et al. ....... 336/178 |
| 2006/0022175 A1 * | 2/2006 | Komuro et al. ............. 252/500 |
| 2006/0108890 A1 * | 5/2006 | Hauger et al. ............... 310/214 |
| 2006/0139785 A1 * | 6/2006 | Kamatani .................... 360/17 |
| 2006/0191601 A1 * | 8/2006 | Komuro et al. ............. 148/302 |

FOREIGN PATENT DOCUMENTS

| | | |
|---|---|---|
| JP | 07-086036 | 9/1995 |
| JP | 08-172742 | 7/1996 |
| JP | 09-186010 | 7/1997 |
| JP | 09-200985 | 7/1997 |
| JP | 10-210689 | 8/1998 |

OTHER PUBLICATIONS

Shvets.pdf: Shvets et al, Poroshkovaya Metallurgiya, No. 7 (115), pp. 71-75, Jul. 1972.*

* cited by examiner

DYNAMO ELECTRIC MACHINE WITH AN ALLOY MEMBER

CLAIM OF PRIORITY

The present application claims priority from Japanese application serial No. 2005-368990, filed on Dec. 22, 2005, the content of which is hereby incorporated by reference into this application.

FIELD OF THE INVENTION

The present invention relates to a dynamo electric machine with an alloy member.

PRIOR ART

An alloy member, a magnetic compensating alloy or a magnetic compensating steel has been used as a disc for by-passing magnetic flux for dynamo electric machines. The material for compensating the magnetic field includes an alloy member, a magnetic compensating alloy and a magnetic compensating steel; the present specification uses the alloy member as a representative of the materials. The alloy member is useful particularly for low Curie point temperature compensators in magnetic circuits.

The disc plays a role to compensate the magnet by reducing the magnetic flux to generate a stable torque at the time of operation, when the magnet does not a desired gap magnetic flux due to its temperature elevation caused by surface loss, as is disclosed in patent document No. 1. In the above description a compensating steel is used to leak magnetic flux to a gap when the magnet temperature elevates by virtue of loss under a temperature designed as 20° C.

Patent document No. 1: Japanese patent laid-open 10-210689

A loss of Fe group degauss alloy member material or Co group degauss alloy member material is larger than that of laminated silicon steel plates; a saturated magnetic flux density and magnetic permeability of the materials increase in a temperature range of from 20 to 200° C. The large loss of the degauss alloy member material is caused by such a small resistance as 0.1 mΩ or less, which results in a large eddy current loss, compared with a laminate of silicon steel plates, each plate having an insulating film.

There are NiFe alloys and CoNiFe alloys, which increase temperature dependency of saturated magnetic flux density and magnetic permeability at low temperatures. These alloys are available in the form of powder or rolled sheets; if they are used as part of the rotor or stator of the dynamo electric machine, powder is better in view of easiness of shaping and utilization rate of the material. When the powder is molded with a mold, the molding has a high magnetic permeability and high resistance; thus application of the molding to high efficiency motors is expected.

The magnetic saturation flux density of the alloy member depends on materials used for the compensator. The magnetic properties change depending on heat treatment. A curie temperature of NdFeB group magnets is low and residual magnetic flux density and coercive force depend strongly on temperatures in a range of from room temperature to 100° C. Therefore, if the magnetic circuit is designed for higher temperature use than room temperature (20° C.) use, an amount of magnetic flux that flows through the magnetic circuit may be different from the designed value at a temperature lower than room temperature. As a result, characteristics of the motor may be different from those designed for use at high temperatures; the difference may be problems depending on use temperatures.

Particularly, when NdFeB group magnets are used in the magnetic circuits, the circuits designed for high temperature use may generate excessive torque at low temperatures, and the circuits designed for low temperature use may become short for torque at high temperatures. Magnetic circuits for automobiles have parts, which are often exposed to −50° C. to 200° C., which leads to difficulty in designing because of temperature dependency of the low Curie temperature magnetic materials such as NdFeB magnets.

In the conventional technologies mentioned above, if the alloy member steel has low resistance and generates heat easily, temperatures of the magnet become lower than the alloy member steel, the torque becomes lower than the value designed. The document does not disclose a loss of the alloy member steel, but discloses division of the magnet in an axial direction so as to reduce an eddy current loss of the magnet. However, it does not disclose an eddy current loss reduction by increasing resistance of the magnet. Accordingly, because of heat generation due to eddy current loss, it is difficult to reduce temperature dependency of the motor characteristics.

SUMMARY OF THE INVENTION

It is an object of the present invention to provide a dynamo electric machine having a magnetic circuit with increased resistance of an alloy member or a magnet and reduced eddy current for dynamo electric machines or the like.

The present invention provides a dynamo electric machine comprising a stator having a plurality of slots and a plurality of teeth, armature windings wound around the teeth and a rotor disposed within the inside of the stator, wherein an alloy member is disposed at an inner periphery of the stator or an outer periphery of the rotor and wherein the alloy member has its surface or inside thereof a high resistance layer.

DESCRIPTION OF THE INVENTION

Figure 1:
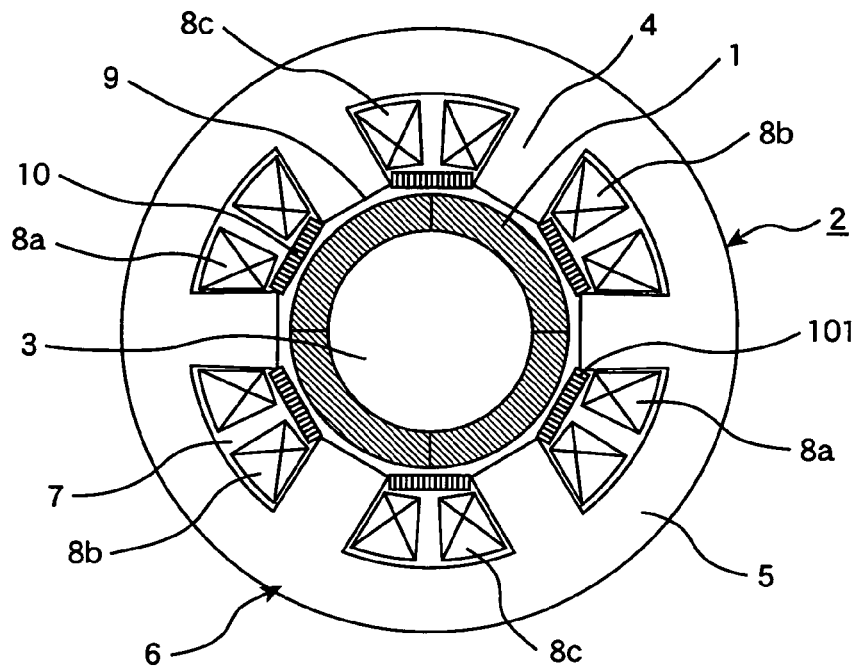
FIG. 1 is a cross sectional view of a dynamo electric machine in a diametric direction according to an embodiment of the present invention.

The alloy member is a soft magnetic material whose magnetic characteristics greatly change in a range of from room temperature (20° C.) to 200° C.; the temperature dependency of soft magnetic characteristics such as the saturation magnetic flux density and magnetic permeability is large at a temperature range of 100° C.±100° C.

If such the alloy member material is used as a part of the magnetic circuit, magnetic flux from the magnet changes by virtue of the alloy member material. The magnetic flux changes its direction and strength by the alloy member near the magnet. If the magnet poles are coupled by the alloy member, the magnetic flux from the magnet hardly comes out from the alloy member, as long as the saturated magnetic flux density is large. The magnetic flux density in a space remote from the magnet may change depending on the presence of the alloy member. If the alloy member is disposed in contact with the magnet, it is possible to generate high magnetic flux density at high temperature or low magnetic flux density at low temperature. By disposition of the alloy member in the space of the magnetic circuit, magnetic flux mainly flows through the alloy member at low temperatures, but the magnetic flux mainly flows through the magnetic circuit at high temperatures.

Alloy member materials are FeNi, CoNi, FeNiM (M: at least a member selected from the group consisting of Ti, Cr, Mn, Co, Cu, Zn, Y, Zr, Nb, Mo, Ru, Rh, Pd, Hf, Ta, W, Ir, Pt, and Au), CoNiM' (M': at least one member selected from the group consisting of Ti, Cr, Mn, Fe, Cu, Zn, Y, Zr, Nb, Mo, Ru, Rh, Pd, Hf, Ta, W, Ir, Pt and Au).

When the rotor is a surface magnet type rotor and the alloy member is used for the stator, the ring-shaped alloy member is disposed at an inner periphery of the stator so that an increase in induction voltage at low temperatures can be prevented. When the saturated magnetic flux density of the alloy member increases by 10% in a temperature range of from 100° C. to 20° C. or lower, and part of the magnetic flux that flows through the rotor and the core may flow through the alloy member so that magnetic flux flowing through the alloy member flows more at low temperatures.

In order to reduce the temperature dependency of induction voltage, it is possible to cause part of the magnetic flux flowing between the rotor and the core to flow through the alloy member at low temperatures by utilization of temperature dependency of the magnetic characteristics of the alloy member.

If the magnet is buried in a position remote from the rotor, the magnetic flux generated from the magnet flows through a ferromagnetic material if the ferromagnetic material is in the rotor; further, there is a magnetic flux flowing into the core from outside. If the alloy member is used for part of the ferromagnetic material in the rotor so that part of the magnetic flux flows through the alloy member. The arrangement of the alloy member, selection of materials and production methods of the alloy member may change the temperature dependency of the magnetic flux amount, and may reduce the magnetic flux density in the outer periphery of the rotor at low temperatures.

Even when the residual magnetic flux density of the rare earth metal magnet in the rotor is high, it is possible to design the machine wherein part of the magnetic flux flows through the magnet compensator or alloy member. Since the alloy member is made of metal, its electrical resistance is low. Therefore, a laminate of thin plates treated for insulating or molding of powder treated for insulating having high resistance should be used. Because an eddy current flows though the alloy member thereby to generate heat to elevate temperatures around the alloy member so that magnetic flux flowing through the alloy member decreases.

By causing part of magnetic flux flowing though the magnetic circuit to flow though the alloy member, it is necessary to prevent heat generation from the alloy member due to eddy current so as to reduce the temperature dependency of the motor characteristics. Thus, forming of an insulating film or a high resistance layer is formed on the alloy member makes the eddy current flow through the alloy member.

Since alloy members are made of metals such as Fe, Co or Ni, insulating films, which do not deteriorate magnetic characteristics or their temperature dependency of the alloy member, are preferable. As the insulating or high resistance materials, oxides, fluorides, nitrides or carbides are selected. If heat treatment is applied to improve magnetic characteristics, materials that do not bring about reaction or diffusion drastically change magnetic characteristics between the high resistance layer and ferromagnetic material are preferably selected.

High resistance layers that do not deteriorate the magnetic characteristics caused by oxidation or diffusion are fluorides and nitrides. Examples of useful fluorides are $BaF_2$, $CaF_2$, $MgF_2$, $SrF_2$, $LiF$, $NdF_2$, $PrF_3$, $SmF_3$, $EuF_3$, $GdF_3$, $TbF_3$, $DyF_3$, $CeF_3$, $HoF_3$, $ErF_3$, $TmF_3$, $YbF_3$, $LuF_3$, $LaF_2$, $NdF_2$, $PrF_2$, $SmF_2$, $SmF_2$, $EuF_2$, $GdF_2$, $TbF_2$, $DyF_2$, $CeF_2$, $HoF_2$, $ErF_2$, $TmF_2$, $YbF_2$, $LuF_2$, $YF_3$, $ScF_3$, $CrF_3$, $MnF_2$, $MnF_3$, $FeF_2$, $FeF_3$, $CoF_2$, $CoF_3$, $NiF_2$, $ZnF_2$, $AgF$, $PbF_4$, $AlF_3$, $GaF_3$, $SnF_2$, $SnF_4$, $InF_3$, $PbF_2$ and $BiF_3$. These compounds may contain impurities such as C, O, N etc as the high resistance layer as long as the main structure is maintained.

In the case where a plurality of fluorine compounds is mixed, mixtures of the fluorine compounds and oxides or mixtures of the fluorine compounds and nitrides may contain the impurities. As nitrides, AlN, $Si_2N_4$, BN, etc. are useful. The powder of the alloy member having the high resistance layer and another powder that exhibits ferromagnetism may be employed.

The powder of the high resistance layer may be coated on the surface of the alloy member or a solution of the high resistance material is coated on the alloy member, followed by removing a solvent from the coating. The high resistance layer may be formed by film forming techniques such as vacuum evaporation or sputtering on the alloy member. The high resistance material powder having a particle size smaller than that of the powder of the alloy is mixed with the powder of the alloy. The high resistance material powder is mixed with a solvent, and the resulting solution is sprayed on the surface of the alloy member, followed by removing the solvent.

It is possible to form the high resistance layer by the above mentioned methods on an iron material having a saturated magnetic flux density of 1.0 T or more or on a high coercive force material. An average thickness of the high resistance layer is 1 nm to 10000 nm, which may be controlled based on designed magnetic characteristics or electrical resistance.

A cross sectional area at the tip of the teeth (the tip of the teeth of the rotor) should be larger than that of the teeth center (a center position between the tip of the rotor and the core back) and the alloy member is disposed. The materials for the teeth and the core back are different and part of them is substituted with the alloy member. If a high torque is desired by increasing magnetic flux density, the alloy member is preferably arranged only at the position near the magnet of the rotor. According to embodiments of the present invention, it is possible to make the temperature dependency of the motor characteristics small.

DETAILED DESCRIPTION OF THE PREFERRED EMBODIMENTS

In the following preferred embodiments of the present invention are described.

FIG. 1 shows a cross sectional view of a dynamo electric machine using an alloy (hereinafter referred to as an alloy dynamo electric machine or dynamo electric machine with an alloy member) in a diametric direction. In the following, the reference numerals in FIG. 1 are used in FIGS. 2 and 5-8 to designate the same members. Unless necessary, explanations of the same reference numerals in FIGS. 2 and 5-9 are omitted to avoid duplicates.

In FIG. 1, stator 2 comprises teeth 4, a core back 5 consisting of a stator iron core 6 and armature windings 8a-8c of concentric winding wound around the teeth in slots 7 between the teeth 4 (U phase winding 8a, V phase winding 8b and W phase winding 8c of three phase winding). Because the alloy dynamo electric machine has 4 poles-6 slots, a slot pitch is 120 degrees in electric angle.

The rotor is inserted into shaft bore 9 or rotor insertion bore 10 and permanent magnets 1 are disposed on an outer periphery of the rotor shaft 3. As the stator, amorphous material of FeSiB alloy foil having a thickness of about 25 μm was used, which was prepared by punching amorphous foil and coating resin on the foil with a thickness of one third or less; then, the foil was press-molded so as to increase space factor. When amorphous material is used as the stator, a low loss is achieved at a high speed rotation of 1000 rpm or more. This is because the amorphous material has a hysteresis loss and an eddy current smaller than the silicon steel. Therefore, the amorphous material is suitable for domestic appliance motors for such as air-conditioners, generators for dispersed power source, HEV driving motors, etc. If harmonic components or high order components are imposed on a voltage wave form, distortion in the voltage wave form may be generated. The eddy current loss in the magnet due to the high order wave components should be minimized in order to increase efficiency. In order to do so, the alloy member having resistance equal to or more than the magnet is arranged between teeth 4 of the inner side thereof. As the alloy member, Fe 70 wt %-Ni 30 wt % alloy was used. In order to increase of the alloy member, a fluoride film having a thickness of 1 to 1000 nm was formed on the powder of the alloy having a particle size of 10 to 100 μm. A method for forming the film is explained in the following.

Fe 70 wt %-Ni 30 wt % alloy powder was treated with gel or sol $LaF_3$ solution to form crystalline or amorphous film whose main ingredient is $LaF_3$. In coating the powder, solvents that do not give magnetic or structural damage to the magnetic powder are selected. An average thickness of the coating film of LaF3 was 1 to 1000 nm. Impurities such as oxides or carbon compounds may be present near the interface between the fluoride layer and the magnetic powder.

Solutions of fluorides are prepared by using $BaF_2$, $CaF_2$, $MgF_2$, $SrF_2$, LiF, $LaF_3$, $NdF_2$, $PrF_3$, $SmF_3$, $EuF_3$, $GdF_3$, $TbF_3$, $DyF_3$, $CeF_3$, $HoF_3$, $ErF_3$, $TmF_3$, $YbF_3$, $LuF_3$, $LaF_2$, $NdF_2$, $PrF_2$, $SmF_2$, $EuF_2$, $GdF_2$, $TbF_2$, $DyF_2$, $CeF_2$, $HoF_2$, $ErF_2$, $TmF_2$, $YbF_2$, $LuF_2$, $YF_2$, $ScF_3$, $CrF_3$, $MnF_2$, $MnF_3$, $FeF_2$, $FeF_3$, $CoF_2$, $CoF_3$, $NiF_2$, $ZnF_2$, AgF, $PbF_4$, $AlF_3$, $GaF_3$, $SnF_2$, $SnF_4$, $InF_3$, $PbF_2$, $BiF_3$ or combinations thereof.

Composite fluoride compounds or fluorine compounds represented by $M_xF_y$ (M: one or more elements, x: an integer of 1 to 5, y: an integer of 1 to 10) may be used. Part of fluorine may be substituted by light elements such as oxygen, carbon, nitrogen, boron, etc. The fluoride is formed on the surface of the powder by surface treatment, and the resulting powder is pressure-molded to obtain a compacted molding having a density of 90 to 99%. The compacted molding can be machined, and resistance of the compacted molding is 150 mΩcm or more.

The fluoride can be prepared by other methods, which are explained.

Ni 70 wt %-Fe 30 wt % alloy amorphous strip was prepared by rapid quenching a mother alloy; then the strip was crushed and ground to produce powder whose average particle size was 1 to 100 μm.

Then, a gel solution of $LaF_3$ was used to form a crystalline or amorphous film whose main ingredient was $LaF_3$ on the entire or a part of the surface of the magnetic powder. In coating the solution on the Ni 70 wt %-Fe 30 wt % magnetic powder, a solvent that does not give magnetic or structural damage the magnetic powder is selected. A thickness of the formed $LaF_3$ is 1 to 10000 nm on average. $LaF_3$ having an average particle size of 10 to 20 nm was coated to have a coating having an average thickness of 100 nm; the structure or composition of the coating was not changed, which was confirmed by analysis with X-ray and TEM.

At least one of the compound containing fluorine and amorphous fluorine compound having the similar composition was coated on the surface of the molded powder and the coating was heat treated at 200° C. or higher thereby to eliminate molding stress and to reduce hysteresis as well.

Figure 2:
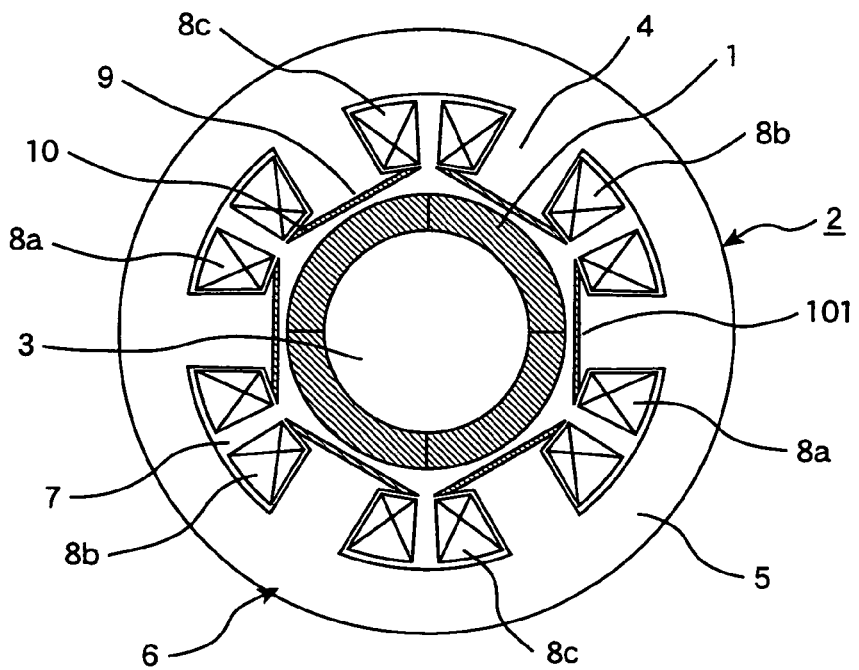
FIG. 2 is a cross sectional view of a dynamo electric machine in a diametric direction according to another embodiment of the present invention, wherein a cross sectional areas of the teeth are different at positions of the stator in diametric direction.

In order to make voltage wave stress small, making a cross sectional area of the teeth near the gap large is effective as shown in FIG. 2. The stator 2 of a dynamo electric machine with an alloy member comprises stator iron core 6 having teeth 4 and core back 5 and armature windings 8a-8c of concentric winding (three phase windings consisting of U phase winding 8a, V phase winding 8b, W phase winding 8c). Since the dynamo electric machine with the alloy member is 4 poles and 6 slots, a slot pitch is 120 degrees in an electric angle.

Figure 3:
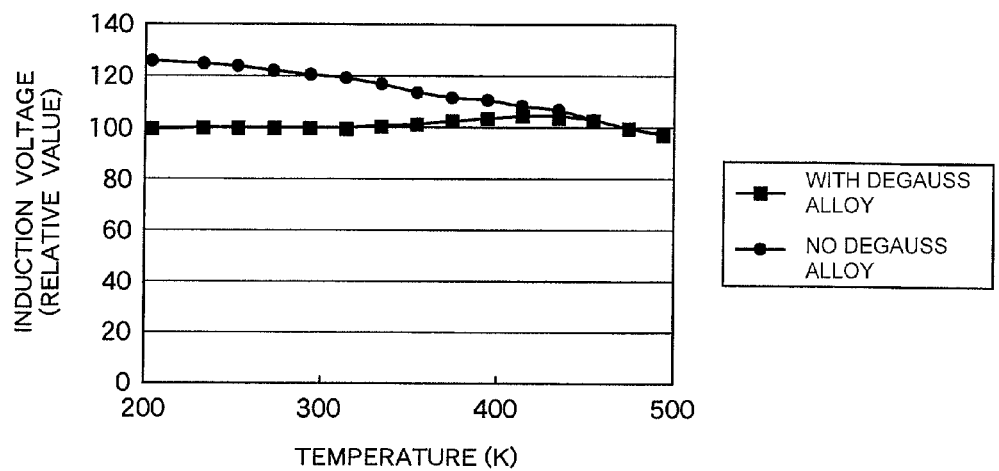
FIG. 3 is a graph showing temperature dependency of induction voltage of the dynamo electric machine according to the embodiment.

The rotor is inserted into the shaft bore 9 or the rotor insertion bore 10 and permanent magnets 1 are arranged on the outer periphery of the rotor shaft. FeSiB alloy amorphous strip or silicon steel foil having a thickness of about 25 μm was punched out and resin coated, followed by press-molding thereby to increase a space factor. Material for the permanent magnets was $Nd_2Fe_{14}B$. The various compositions or structures of the main phase consisting of $Nd_2Fe_{14}B$ were used to prepare rotors. The results are shown in FIG. 3.

The alloy member 101 is disposed between the tips of the teeth; an area of the alloy member is wider than the teeth. According to this structure, when an ambient temperature of the rotor becomes lower than room temperature, magnetic flux flows through the alloy member. When the alloy members are connected to form an annular form, part of the magnetic flux does not flow through the teeth, but flows through the annular alloy member.

According to this by-pass magnetic flux structure, torque fluctuation is suppressed. The alloy members 101 are disposed to the stator side, whereby the torque fluctuation at −50° C. and 200° C. is suppressed.

The temperature dependency of the residual magnetic flux density of the magnet changes at about 0.1%/° C., and an amount of magnetic flux from the magnet increases. This prevents occurrence of temperature dependency of torque.

The annular alloy member is disposed on the inner periphery of the stator. Induction voltage of the dynamo electric machine at ambient temperatures was measured. The results are shown in FIG. 3. Compared with the case where the alloy member is not disposed, the dynamo electric machine using the alloy member suppresses the induction voltage at low temperatures.

Figure 4:
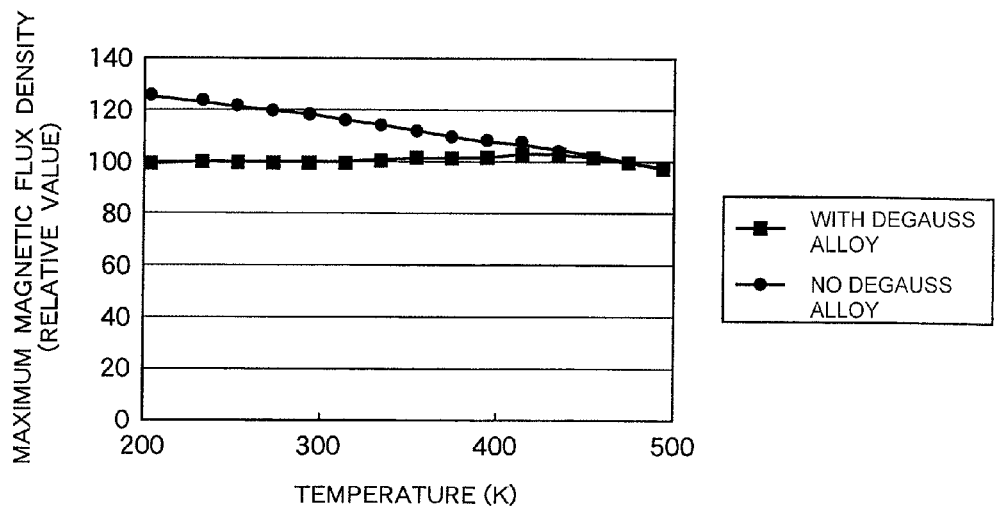
FIG. 4 is a graph showing temperature dependency of the maximum magnetic flux density of the dynamo electric machine according to the embodiment.

Measurement results of a dynamo electric machine wherein the annular alloy member is disposed on the outer periphery of the rotor are shown in FIG. 4. Since the magnetic flux from the magnet is suppressed at low temperatures, the temperature dependency of the magnetic flux density on the surface of the rotor becomes small because of the disposition of the alloy member.

Figure 5:
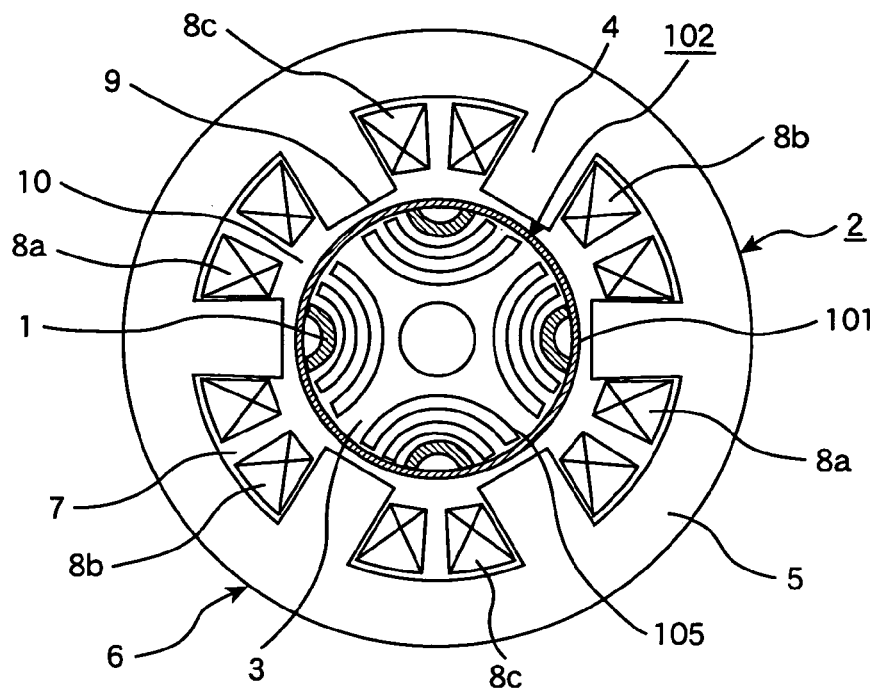
FIG. 5 is a cross sectional view of a dynamo electric machine in a diametric direction according to a still another embodiment of the present invention.

FIG. 5 shows a cross sectional view of a dynamo electric machine wherein slits 105 for utilizing reluctance torque are formed. The stator 2 of the alloy dynamo electric machine comprises stator iron core 6 having teeth 4 and core back 5 and armature windings 8a-8c of concentric winding wound around the teeth in slots 7 between the teeth 4 (three phase windings consisting of U phase winding 8a, V phase winding 8b and W phase winding 8c). Since the alloy dynamo electric machine is of a 4 poles-6 slots, a slot pitch is 120 degrees in electric angle.

The rotor is inserted into shaft bore 9 or rotor insertion bore 10, and permanent magnets 1 are disposed on the outer periphery of the rotor sgaft3. The residual magnetic flux density of the permanent magnets 1 exhibits temperature dependency, which is large at low temperatures. Therefore, in starting the dynamo electric machine at low temperatures, high torque characteristics, which are higher than the designed characteristics, may cause problems. Alloy member 101 is disposed on the outer periphery of the rotor 102 in a ring form, as shown in FIG. 5. The ring form alloy member may be constituted by assembling divided segments on the outer periphery.

The alloy member 101 is made of a NiFe alloy, which has a high resistance thereby to suppress temperature elevation. The resistance value is higher than that of the permanent magnets. By disposition of the alloy member, part of the magnetic flux from the permanent magnets can by-pass the alloy member. As a result, the torque can be suppressed. The permanent magnets 1 can be bond magnets, which bring about the similar advantages, too.

Figure 6:
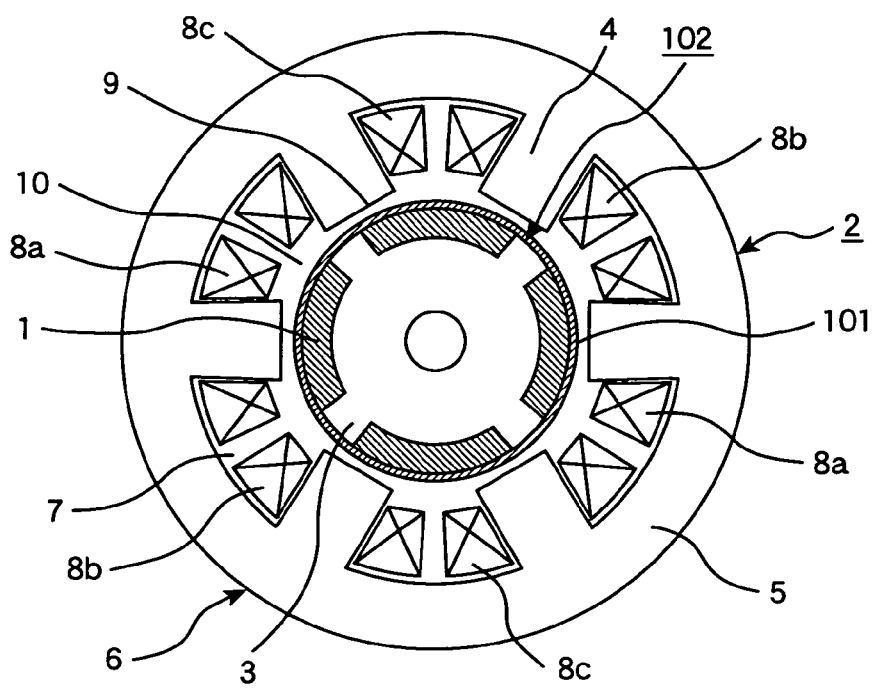
FIG. 6 is a cross sectional view of a dynamo electric machine in a diametric direction according to a still further embodiment of the present invention.

In the dynamo electric machine shown in FIG. 6, the permanent magnet assembly 1, which consists of 4 arc-shape segments each being a sintered magnet, is disposed on the outer periphery of the rotor 102. An outermost layer is the alloy member 101, and magnetic flux from the permanent magnet 1 at low temperatures by-passes the alloy member 101 thereby to reduce the temperature dependency of motor characteristics.

Figure 7:
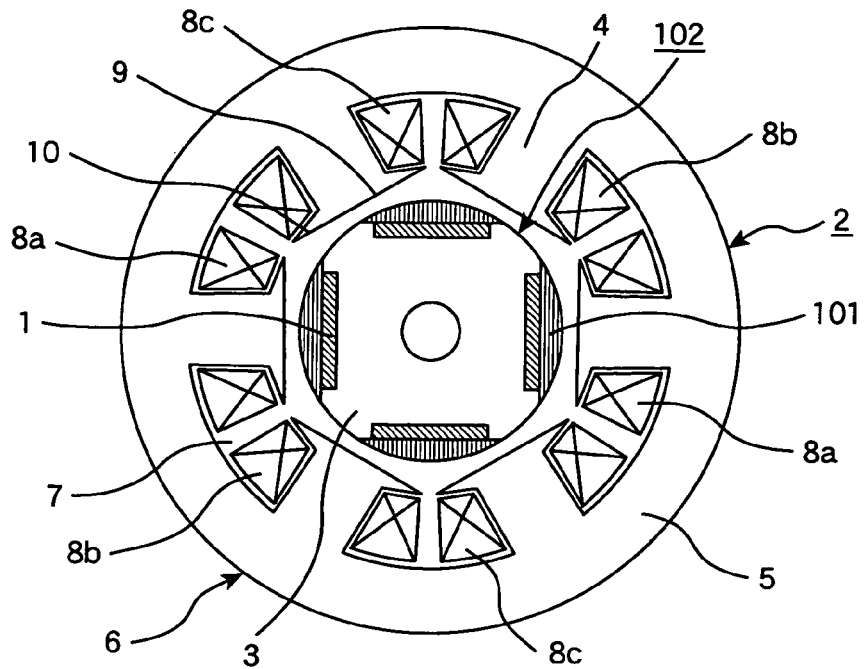
FIG. 7 is a cross sectional view of a dynamo electric machine in a diametric direction according to another embodiment of the present invention.

FIG. 7 shows a rotor provided with permanent magnets 1 having an almost cubic form, which is disposed within the rotor 102. A cross sectional area of the teeth at the gap side is larger than that of opposite side. Since the alloy member 101 is disposed, the magnetic flux density in the surface has a small temperature dependency. Accordingly, the temperature dependency of induction voltage and induction voltage wave form becomes small.

Figure 8:
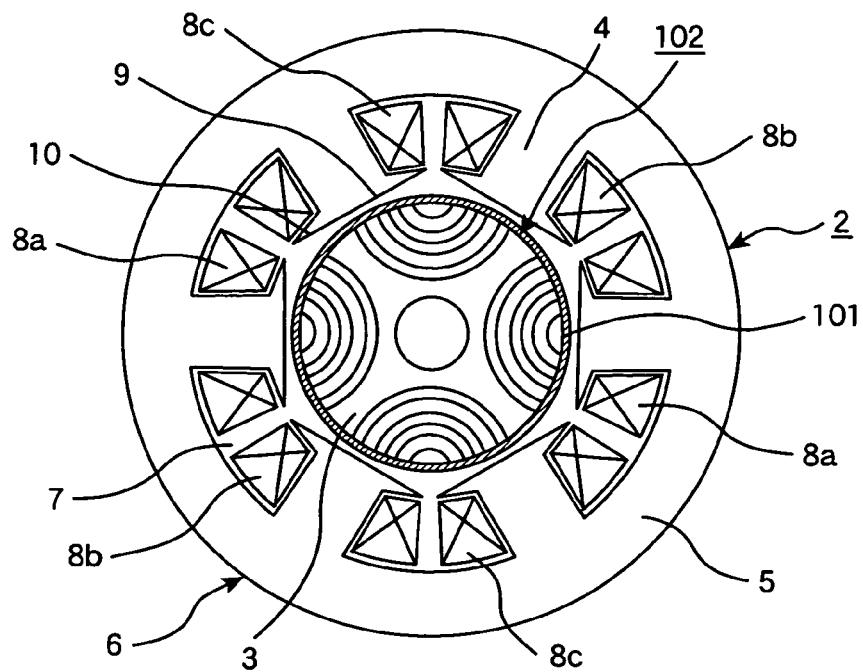
FIG. 8 is a cross sectional view of a dynamo electric machine in a diametric direction according to a still another embodiment of the present invention.

FIG. 8 shows a structure of a cross sectional view of a dynamo electric machine with a rotor 102, which has no permanent magnet. The alloy member 101 makes temperature dependency of reluctance torque large. Reluctance at temperatures lower than room temperature becomes small and reluctance at temperatures higher than room temperature becomes large. Because the magnetic permeability of the alloy member 101 at temperatures lower than room temperature is different from that at 100° C., the reluctance at lower temperatures than the room temperature being 10% larger than temperatures higher than room temperature.

What is claimed is:

1. A dynamo electric machine comprising:
a stator having a plurality of slots and a plurality of teeth;
armature windings wound around the teeth; and
a rotor;
wherein an alloy member is disposed at an inner periphery of the stator;
wherein the alloy member has a saturated magnetic flux density that increases by 10% as the temperature increases in a temperature range from 20° C. to 100° C.; and
wherein a material whose main ingredient is a fluorine compound is formed on the surface of the alloy member, or within the alloy member.

2. The dynamo electric machine according to claim 1, wherein the fluorine compound is $LaF_3$.

3. The dynamo electric machine according to claim 1, a fluorine compound is formed on at least one of the surface of the alloy member and within the alloy member.

4. The dynamo electric machine according to claim 1, wherein the alloy member is configured in the space of the magnetic circuit such that magnetic flux mainly flows through the alloy member at low temperatures, but the magnetic flux mainly flows through the magnetic circuit at high temperatures.

5. A dynamo electric machine comprising:
a stator having a plurality of slots and teeth;
armature windings wound around the teeth; and
a rotor disposed inside the stator;
wherein an alloy member is disposed in the inner periphery of the stator and the alloy member has on its surface, or inside thereof, a high electrical resistance material; and
wherein the alloy member has a saturated magnetic flux density that increases by 10% as the temperature increases in a temperature range from 20° C. to 100° C.

6. A dynamo electric machine comprising:
a stator having a plurality of slots and a plurality of teeth;
armature windings wound around the teeth; and
a rotor disposed within the stator;
wherein an alloy member is disposed in the inner periphery of the stator;
wherein the saturated magnetic flux density in the surface of each tooth at the center position in the circumferential direction of the portion closest to the rotor exceeds the saturated magnetic flux density of the alloy member;
wherein the sectional area of each tooth at the portion closest to the rotor is larger than the sectional areas of portions farther from the rotor; and
wherein the alloy member has a saturated magnetic flux density that increases by 10% as the temperature increases in a temperature range from 20° C. to 100° C.

7. A dynamo electric machine comprising:
a stator having a plurality of slots and a plurality of teeth;
armature windings wound around the teeth; and
a rotor disposed inside the stator;
wherein an alloy member is disposed at an outer periphery of the rotor;
wherein the alloy member has a saturated magnetic flux density that increases by 10% as the temperature increases in a temperature range from 20° C. to 100° C.

8. The dynamo electric machine according to claim 7, wherein a material whose main ingredient is a fluorine compound is formed on at least one of the surface of the alloy member and within the alloy member.

9. The dynamo electric machine according to claim 8, wherein the fluorine compound is $LaF_3$.

10. The dynamo electric machine according to claim 7, wherein the alloy member is configured in the space of the magnetic circuit such that magnetic flux mainly flows through the alloy member at low temperatures, but the magnetic flux mainly flows through the magnetic circuit at high temperatures.

* * * * *